United States Patent [19]

Rumsey

[11] 3,860,982  
[45] Jan. 21, 1975

[54] CONVERTIBLE TRAILER/BOATS

[76] Inventor: Rollin Douglas Rumsey, 148 Summer St., Buffalo, N.Y. 14222

[22] Filed: May 17, 1971

[21] Appl. No.: 143,835

[52] U.S. Cl. .................. 9/1 T, 114/66.5 F
[51] Int. Cl. .............................. B60f 3/00
[58] Field of Search ........ 115/1 R, 1 A; 9/1 R, 1 T, 9/2 R, 2 F, 2 S, 2 C, 4 R; 114/66.5 F, 66.5 R, 67 A; 280/124 A; 267/57

[56] References Cited
UNITED STATES PATENTS

| | | | |
|---|---|---|---|
| 2,126,084 | 8/1934 | Balz | 280/124 A |
| 2,757,017 | 7/1956 | Matthias et al. | 267/57 |
| 2,850,747 | 9/1958 | Bouchard, Sr. | 9/1 T |
| 2,984,845 | 5/1961 | Gregoire | 9/1 T |
| 3,137,513 | 6/1964 | Marot | 280/124 A |
| 3,193,851 | 7/1965 | Fiebelkorn | 9/1 T |
| 3,308,782 | 3/1967 | Dahl | 115/1 R |
| 3,744,070 | 7/1973 | Shaw | 9/1 T |

Primary Examiner—Lloyd L. King
Assistant Examiner—Randolph A. Reese
Attorney, Agent, or Firm—Christel & Bean

[57] ABSTRACT

A vehicular trailer structure capable of carrying a standard truck camper, a removable, solid cover commonly referred to as a "cap," or collapsible tent is convertible into an efficient water craft by rotating pontoon floats on longitudinal hinges by means of a toggle locking linkage whereby the road wheels are elevated above the water and the width is substantially increased for stability. Provision is made to resiliently connect the floats to the trailer in order to isolate the relatively frail superstructure from racking and pounding loads imposed by rough water at high speeds. Provision is also made for ram air augmented lift to improve high speed operation. With camper removed or tent folded, the unit may be effectively operated as a sailing catamaran or utility runabout.

11 Claims, 13 Drawing Figures

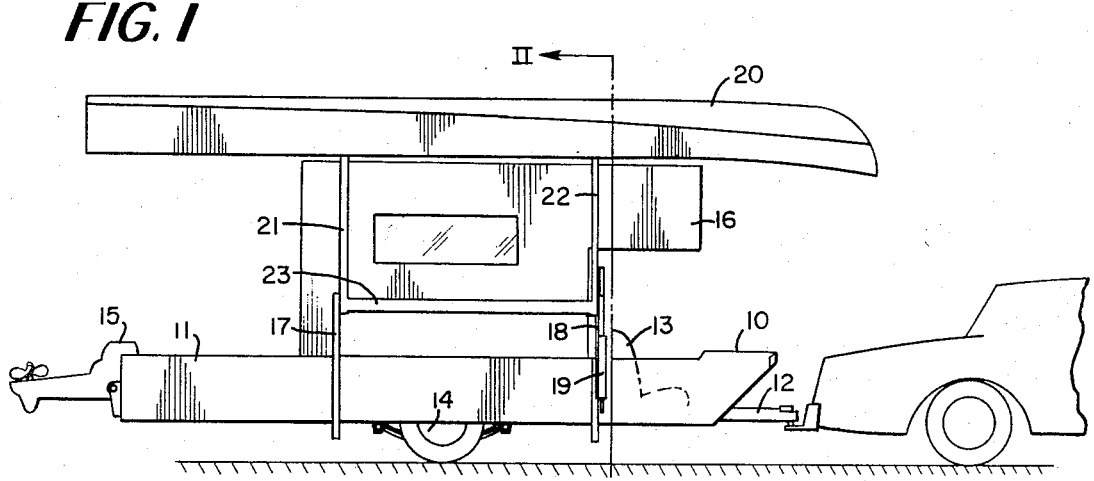
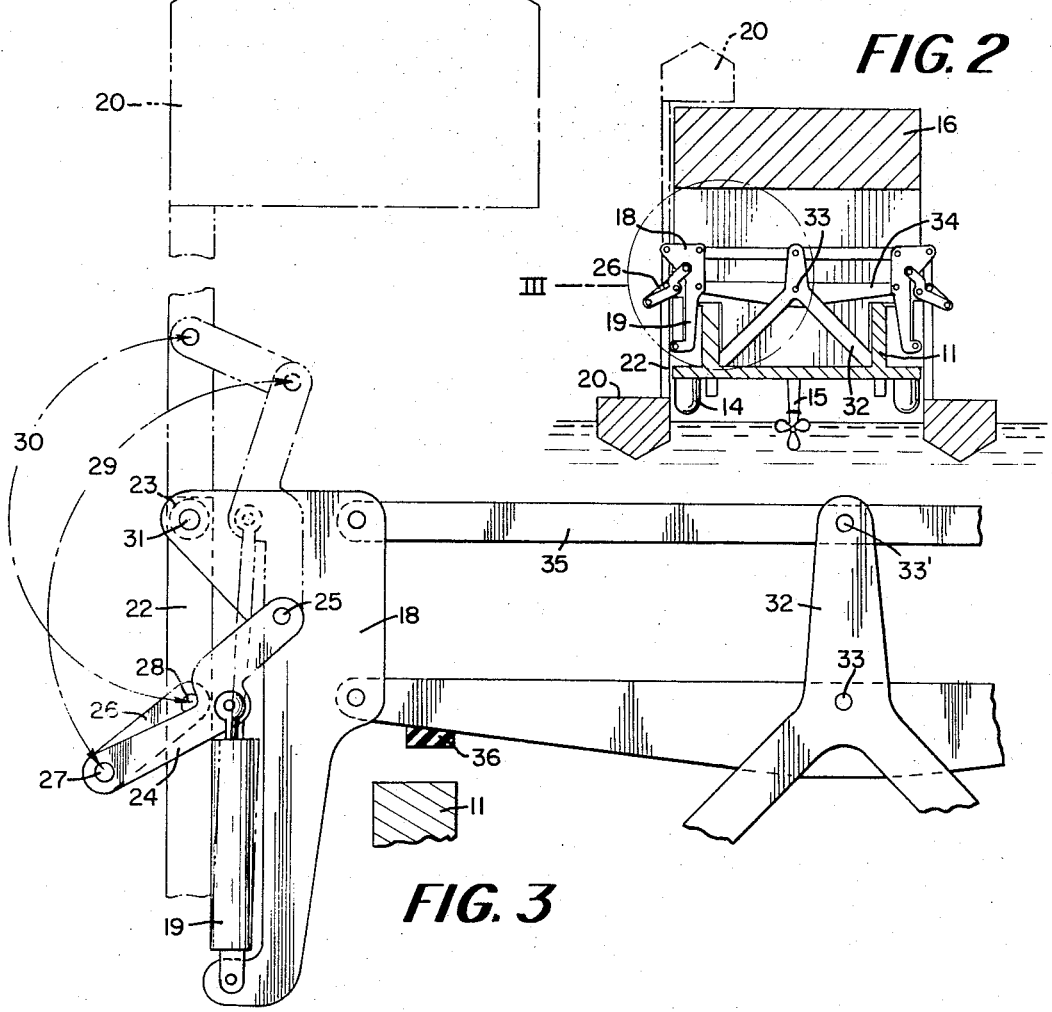

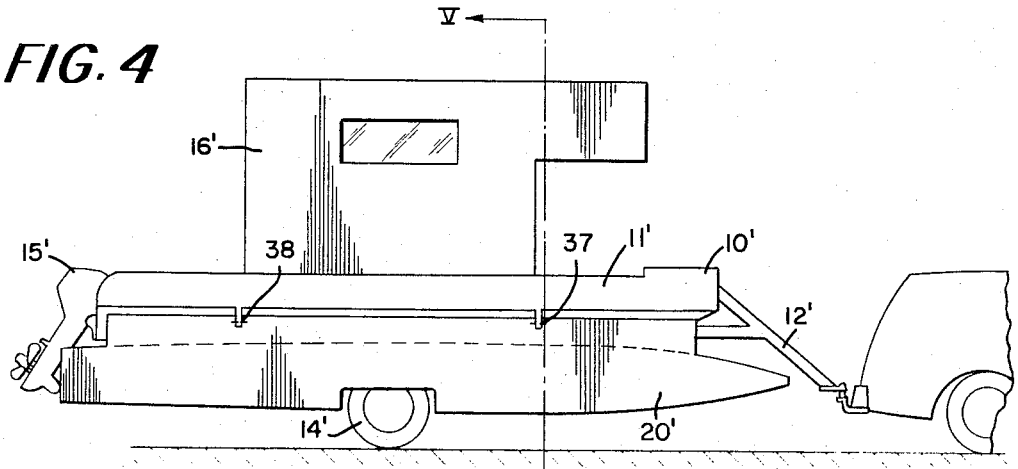
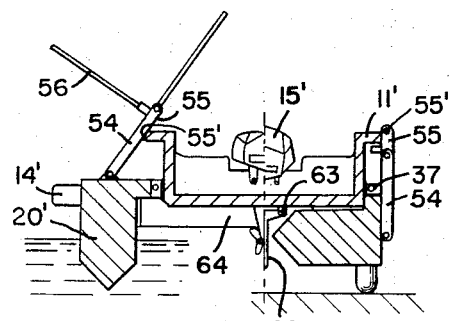
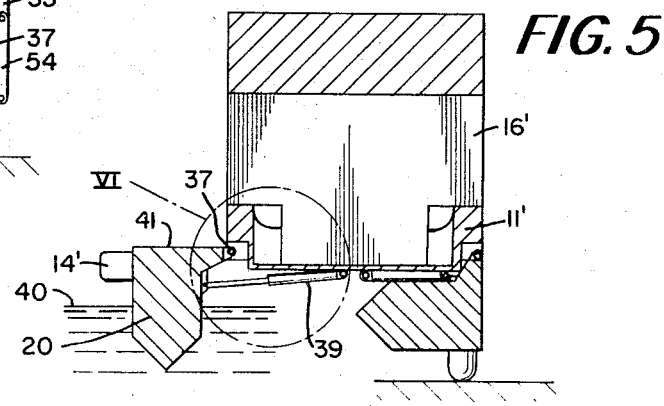
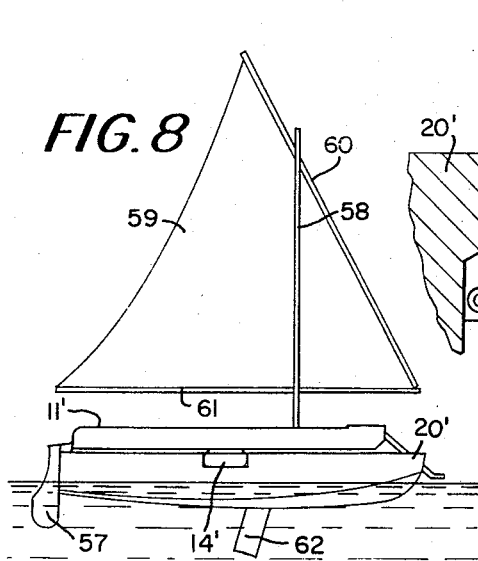

PATENTED JAN 21 1975

CONVERTIBLE TRAILER/BOATS

BACKGROUND OF THE INVENTION

1. Field of the Invention

This invention lies in the general field of recreational vehicles. It combines the generic capabilities of truck and tent campers as well as travel trailers with those of houseboats, utility craft, water ski runabouts and sailing catamarans in one vehicle easily converted from one function to another.

2. Prior Art

Prior efforts to produce amphibious vehicles have had relatively limited success. The military have developed a number of successful floating vehicles without concern for water speed. Prior amphibious houseboats and the like have either lacked stability, speed or rough water capabilities; their construction has been heavy and complex, in many instances as well, which have limited their performance and produced high costs.

Summary of the Invention

This invention relates to amphibious vehicles and in particular concerns itself with vehicular trailers equipped with longitudinal retractible floats. The floats are hinged axially from the trailer structure and in a preferred embodiment are coupled thereto by means of a three point resilient mount, capable of isolating racking moments.

Heretofore, camping vehicles have been restricted to motor vehicle roadways, whereas with the subject invention, they may be used as well on waterways with performance comparable to most boats.

Prior pontoon craft as well as amphibious vehicles are both heavy and unseaworthy. The present invention being a trailer does away with the weight associated with groud propulsion and the rigidity required for quartering seas by the use of its unique three point suspension.

It is accordingly an important object of the present invention to provide a light weight camping vehicle capable of high mobility on land and water.

Another object of the invention is to provide an amphibious vehicle of multiple usage, including uses as a camping trailer, utility trailer, high performance houseboat, utility boat and sailing vessel.

Another object of the invention is to provide a relatively narrow vehicle for land usage and a wide stable water craft having walkway decking completely around the cabin structure.

A further object of the invention is to provide a three point suspension to the cabin structure, thereby eliminating water wave induced racking stresses and providing greater comfort.

Other objects, features and advantages of the present invention will be readily apparent from the following detailed description of preferred embodiments thereof taken in conjunction with the accompanying drawings.

Brief Description of Drawings

FIG. 1 is a longitudinal elevational view of an amphibious houseboat trailer embodying features of the invention.

FIG. 2 is an end sectional view of the trailer with the floats lowered taken along a line II—II of FIG. 1.

FIG. 3 is an enlarged fragmentary detail view of substantially the area III of FIG. 2.

FIG. 4 is a longitudinal elevational view of an alternate design amphibious trailer embodying preferred features of the invention.

FIG. 5 is sectional view showing one float extended and one retracted and taken substantially along a line V—V of FIG. 4.

FIG. 6 is an enlarged fragmentary detail sectional view of substantially the area VI of FIG. 5 with the addition of an isolation suspension.

FIG. 7 is a sectional view similar to FIG. 5 with the truck camper removed and showing an alternate retraction linkage.

FIG. 8 is a longitudinal elevational view of an amphibious trailer embodying features of the invention and equipped as a sailing vessel.

Description of the Preferred Embodiments

Figure 9:
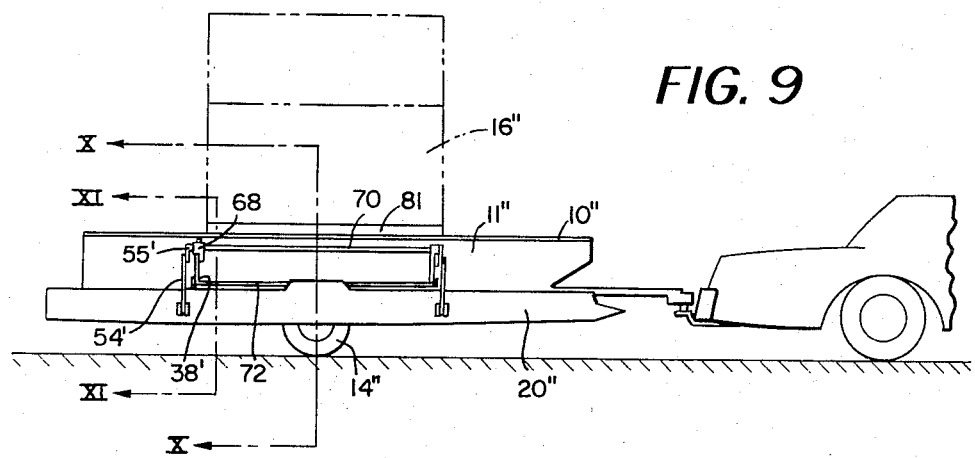
FIG. 9 is a longitudinal elevational view of an amphibious camping tent trailer version of the invention.

Although the vehicle illustrated could be self propelled on land as well as water and thereby find utility as a military, swamp vehicle, etc., its primary function is foreseen as a recreational camper. The basic concept consists of an open trailer substantially similar in size but longer than the standard pickup truck upon which a standard truck camper body or cap may conveniently be placed by running the trailer under a jacked camper and lowering it thereon in the same fashion in which it is installed on a truck. For this purpose the tail gate or motor mounting transom is cut as low as possible to minimize jacking effort. For maximum reliability and safety both on land and afloat, pontoon floats are hinged on a single longitudinal pivot with hydraulic cylinder actuation. Normal gravity forces hold the floats in either extended or retracted position, and positive position locks normally would be provided as well.

A convertible trailer/boat embodying features of the invention and as exemplified in FIG. 1 has a trailer structure 10 comprising a box like hull portion 11, drawbar 12, driver's chair 13, spring suspended wheels 14, provision for mounting an outboard motor 15, a truck camper body 16, a rigid rear hinge support member 17, a floating forward hinge support member 18, hydraulic actuation cylinder 19, pontoon float members 20 and float mounting struts 21 and 22 interconnected by torsion tube 23.

Raising and lowering of the floats is accomplished by hydraulically powered linkages shown in FIGS. 2 and 3 consisting of a double acting hydraulic cylinder 19 attached at its housing end to support member 18 and its rod end to the near midpoint of offset lever 24 one end of which also attaches to support 18 at pin 25 while the other engages link 26 at pin 27 which in turn is coupled to float mounting strut 22 at pivot 28 such that in the down position pins 25, 27 and 28 lie in substantially a straight line thereby affording a mechanical down lock.

When cylinder 19 is extended by hydraulic pressure means, pin 27 travels through angle 29 about pin 25 — substantially less than 180° and pin 28 on strut 22 moves through angle 30 above pivot 31 a distance substantially equal to 180°. Since strut 21 is torsionally connected to strut 22 by torque tube 23, its motion will parallel strut 22's. It may be noted that the highest loading applied to the linkage occurs as the float reaches the water where it must elevate the trailer structure, accordingly the toggle mechanism at this point approaches its greatest mechanical advantage thereby achieving the desirable result of requiring nearly constant hydraulic cylinder pressure throughout a substantial portion of the raise/lower stroke. A structural frame member 32 of a generally inverted Y configuration is suitably mounted adjacent the forward end of hull 11 at the front end of camper body 16. The upright leg of member 32 carries a pair of pivot pins 33 and 33'. Frame 32 transmits the entire forward weight of the trailer hull into pivot 33 from whence it is equally applied to the floats by pivotal beam 34 acting in conjunction with parallel tie rod 35, pivotal about pivot pin 33; to overcome float tilting. Reciprocal vertical motion of the forward float portion is thus provided. Cushioned limit stops normally would be provided to prevent rigid bottoming at the extremes of travel such as rubber bumper 36.

A preferred embodiment of the invention exemplified in FIG. 4 comprises: trailer structure 10' consisting of hull structure 11', drawbar 12', outboard motor 15', truck camper body 16' and hinged float members 20' to which resiliently mounted wheels 14' are attached. The transition from land to water mobility is illustrated by FIG. 5 wherein one float is shown retracted for land use and the other 20' extended for water. Float 20' pivots about a longitudinal hinge line formed by hinges 37 and 38 under the urging of double acting hydraulic cylinders such as 39. In the extended (water) position, wheel 14' is raised an appreciable distance above water surface 40 in which position it is clear of waves and serves as a dock bumper, and at the same time the floats upper surface 41 becomes a stable deck walkway alongside cabin 16'.

Although the configuration of FIG. 5 would normally be entirely adequate for the aft hinge point 38, a resilient forward float mounting is very desireable for rough and quartering seas and forms an important feature of the present invention. A preferred embodiment of such a suspension mount is illustrated in FIG. 6 wherein hinge point 37 is carried by the outboard end of tee lever 42 while its inboard end by means of elongated holes engages dual pivots 43 and 44 mounted on trailer hull structure 11'. The lower extension 45 of lever 42 is connected to a similar lever on the opposite side by resilient tie rod 46 consisting of tubular housing 47, an elastomeric center bumper or resilient snubber 48, pairs of preload springs 49, washers 50, elastomeric end stop bumpers 51, and piston headed rods 52. Extremities of housing travel are limited by solid stops such as 53. It will be appreciated that the function of the suspension of FIG. 6, as was the case of that of FIG. 3, distributes the forward vehicle load equally to the two floats while allowing them to pitch differentially. The latter suspension has the additional capability of allowing both floats to rise relative to the vehicle by compressing springs 49, whereas the prior embodiment is limited by the flexibility of beam 34.

Many vessels and particularly those of the catamaran family are built with considerable elasticity in order that they may flex with the motions of the sea; on the other hand, truck camper bodies are built with a relatively frail shell of high stiffness capable of withstanding little more than the wind and braking loads imposed by the rigid truck body to which they normally are mounted; it is therefore an important part of this invention to provide a lightweight structural mounting vessel for such bodies with the capability of relieving the body of severe sea imposed forces, among which the quarter sea torsional rocking is probably the worst from the body's capability standpoint.

As pointed out and described in the foregoing, the three point mounting using a forward whiffle tree accomplishes this objective. A forward single point is preferable to having the single point rearward for several reasons; among which is the fact that the floats iron out bumps (waves) in the water by the time they reach the rear portion of the float, therefore much greater accelerations are imposed on the forward portion; under power turning and sailing conditions, the bow of the outside float tends to bury (with aft single point) with a resultant danger of broach or upset whereas with the single point forward the tendency is for the outside float to depress its stern and raise its bow with the inside float acting conversely; additionally the forward single point contributes a more comfortable ride with less roll — the greatest contributor to motion sickness.

Resilient seal member 65 serves to effectively trap ram air beneath the vehicle between the floats and appreciably reduce its drag at speeds over 30 miles per hour, where the air lift may approach half the total weight. The rear of the tunnel so formed under the vehicle must similarly be sealed as by resilient flap 64, FIG. 7.

An alternate embodiment of the float deployment linkage, suitable for manual operation on vehicles up to approximately 1,000 lbs. gross weight, is exemplified by the toggle linkage of FIG. 7 consisting of link 54 and lever 55, actuated by removeable erection tool bar 56. Lever is connected at one end to float 20' and at its other end to one end of link 55, in turn pivotably connected to hull 11', as at 55'. Lever 55 is equipped with open ended tool reception sockets located at 90° to one another. By inserting bar 56 into an appropriate socket and manually applying a force thereto, such as in a counterclockwise direction as viewed at the left end of FIG. 7, link 55 will pivot about its pivotal connection at 55' in a counterclockwise direction to in turn swing link 54 in a similar direction for retracting float 20' beneath hull 11' into a position corresponding to that shown at the right end of FIG. 7. In both extended and retracted positions the linkage is locked on dead center, and consequently the maximum torque generated by the linkage on the float is near the extremities of travel where it is required.

Figure 10:
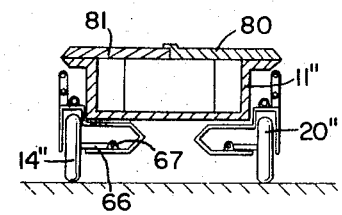
FIG. 10 is a sectional view of the tent trailer vehicle of FIG. 9 taken substantially along its wheel centerline on line X—X of FIG. 9.

A vehicle in accord with the present invention, with the camper body removed, has an enormous amount of stability in water hence can be readily converted into an excellent sailing vessel, FIG. 8, by the addition of rudders 57 and a lateen rig consisting of three equal length spars, Mast 58, boom 61, gaff 60 and sail 59. A retractible pivoted centerboard 62 is permanently attached on centerline below the floor, FIG. 7, on pillow block hinges 63. Many campers prefer a small light weight tent trailer because of ease of maneuverability and driving (trailer not exceeding car width) and unrestricted rear view vision. Such a vehicle embodying features of the invention is illustrated in FIG. 9, wherein trailer 10" is comprised of an open top, box-like frame or hull portion 11", a collapsible tent 16" supported on a pair of foldable frame portions 80 and 81 hingedly mounted on hull portion 11", retracted floats 20" to which wheels 14" are relatively rigidly attached by short swing axles 66, FIG. 10, hung from torsion bars 67 extending generally parallel to the center line of the vehicle and suitably mounted within the interior of floats 20".

Figure 11:
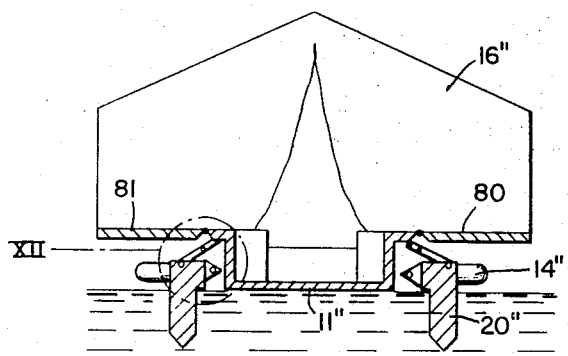
FIG. 11 is a sectional view of the tent trailer of FIG. 9 with the tent erected and floats extended taken substantially along line XI—XI of FIG. 9.

The tent may be erected FIG. 11 with the vehicle on land or water. In this embodiment it is desireable to make the trailer hull portion 11" watertight by covering the hull with a layer or skin of thin impervious material and depend upon the floats 20" for stability and high speed performance acting as water skis.

Figure 12:
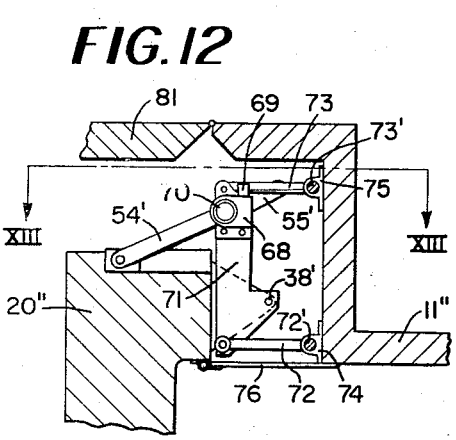
FIG. 12 is an enlarged fragmentary detail view of the suspension and retraction mechanism of substantially the area XII of FIG. 11.
Figure 13:
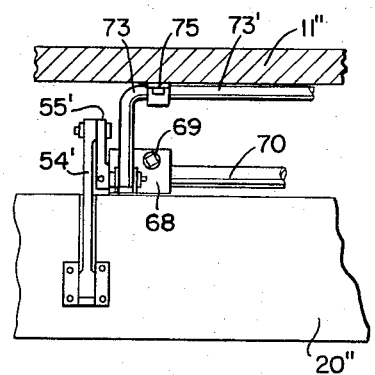
FIG. 13 is a fragmentary plan view taken along line XIII—XIII of FIG. 12.

Retraction and extension of the floats is accomplished by a toggle mechanism similar to the manual system of FIG. 7 but utilizing a manually operated irreversible worm gear actuator 68, FIG. 12. A torque tube 70 extends longitudinally of hull portion 11" along each side thereof and is operatively connected at each of its opposite ends to one end of a toggle lever 55'. The other end of lever 55' is pivotally connected to one end of a link 54', the other end of link 54' being connected to float 20". Thus, when shaft 69 of actuator 68 is turned, torque tube 70 is rotated to effect pivotal movement of lever 55' in a counterclockwise direction as viewed in FIG. 12, for example, about the fixed axis defined by its connection to tube 70. This, in turn, effects pivotal movement of link 54' in a counterclockwise direction to pivot float 20" about hinge pivot 38' into its collapsed inner position.

Pivot hinge 38' floats by means of its mounting on an extension 71 of actuator 68. A pair of vertically spaced, parallel torsion bars 72' and 73' are mounted adjacent hull portion 11" with their respective one ends (not shown) anchored to hull portion 11" and their other ends rotatably mounted in journals 74 and 75. These other ends are provided with outturned levers 72 and 73 pivotally connected at their respective distal ends to the opposite ends of extension 71, forming therewith a parellogram linkage connecting float 20" to hull portion 11". The torsion bars 72' and 73' are formed to twist to a certain degree enabling those portions remote from the anchored ends to rotate or oscillate to effect limited pivotal movement of levers 72 and 73. This torsional characteristic of bars 72' and 73', together with the torque tube 70, constitutes a means for resiliently suspending the floats from the frame and is effective to absorb shocks and impacts imparted to floats 20" and prevent the transmission thereof to the hull portion 11".

Augmentation of float dynamic lift at high speeds, by trapped ram air support is assured by hinged sealing flap 76, FIG. 12 acting in conjunction with a stern resilient seal such as 64, FIG. 7.

It will be understood that variation and modifications may be effected without departing from the spirit and scope of the novel concepts of this invention.

I claim:

1. An amphibious camping vehicle comprising: a frame, a pair of elongated pontoon floats, means mounting said floats relative to said frame for pivotal movement about parallel axes extending longitudinally of said frame between an outer extended position and an inner collapsed position, wheel means carried by said floats for engagement with a ground surface in said inner collapsed position of said floats, means resiliently suspending said floats from said frame, and means for pivoting said floats between said extended and collapsed positions including toggle linkages operatively connected to said suspension means, said toggle linkages being connected to said floats, and means for actuating said toggle linkages to swing said floats between said extended and collapsed positions, and means for transmitting the forward weight of said frame to said floats in a manner distributing the weight substantially equally to said floats while allowing said floats to pitch differentially.

2. An amphibious camping vehicle according to claim 1 wherein said frame is provided with an open top, shelter means attached to said frame and adapted to cover said open top, said shelter means comprising frame portions foldable into a collapsed position within the confines of said frame, a collapsible tent connected to said frame portions, said frame portions being extendable to enable said tent to expand to form a shelter.

3. An amphibious camping vehicle according to claim 1 wherein a space is defined between said frame and the water level when said floats are extended and further including means for closing the space on three sides between said floats and under said frame for trapping ram air thereunder.

4. An amphibious vehicle according to claim 3 wherein said space closing means comprises a flap pivotably connected to said float and engageable with said frame.

5. An amphibious vehicle according to claim 4 wherein said space closing means further includes a flap connected between the rear end of said frame and said float to close the rear end of said space.

6. An amphibious camping vehicle according to claim 1 including hitch means at one end of said frame for connection to a powered vehicle and means mounting water propulsion means at the other end of said frame.

7. An amphibious vehicle according to claim 1 wherein said means resiliently suspending said floats from said frame comprises a torque tube extending longitudinally of said frame, said toggle linkages being connected to the opposite ends of said torque tube.

8. An amphibious camping vehicle according to claim 1 wherein said means for transmitting the forward weight of said frame to said floats comprises a frame member of generally inverted Y configuration mounted adjacent the bottom ends thereof to said frame and a beam pivotally connected adjacent the middle thereof to the upright portion of said inverted Y-shaped frame member and pivotally connected adjacent each end thereof to said means resiliently suspending said floats from said frame.

9. An amphibious camping vehicle according to claim 1 wherein said means for transmitting the forward weight of said frame to said floats comprises resilient tie rod means mounted adjacent the middle thereof to said frame and pivotally connected adjacent each end thereof to said means resiliently suspending said floats from said frame.

10. An amphibious camping vehicle comprising: a frame, a pair of elongated pontoon floats, means mounting said floats relative to said frame for pivotal movement about parallel axes extending longitudinally of said frame between an outer extended position and an inner collapsed position, wheel means carried by said floats for engagement with a ground surface in said inner collapsed position of said floats, means resiliently suspending said floats from said frame, means for pivoting said floats between said extended and collapsed positions including toggle linkages operatively connected to said suspension means, said toggle linkages being connected to said floats, and means for actuating said toggle linkages to swing said floats between said extended and collapsed positions, said means mounting said floats further comprising a parallelogram linkage and said means resiliently suspending said floats comprising torque tube means extending longitudinally of said frame, said toggle linkages being connected to the opposite ends of said torque tube means.

11. An amphibious camping vehicle comprising: a frame, a pair of elongated pontoon floats, means mounting said floats relative to said frame for pivotal movement about parallel axes extending longitudinally of said frame between an outer extended position and an inner collapsed position, wheel means carried by said floats for engagement with a ground surface in said collapsed position of said floats, means resiliently suspending said floats from said frame, means for pivoting said floats between said extended and collapsed positions including toggle linkages operatively connected to said suspension means, said toggle linkages being connected to said floats, means for actuating said toggle linkages to swing said floats between said extended and collapsed positions, and sealing means operatively associated with said frame and said floats for closing in sealing relation the space on three sides between said floats and under said frame and over a water surface in the extended position of said floats for trapping ram air under said frame.

* * * * *